United States Patent
Doshi

(10) Patent No.: US 8,688,103 B2
(45) Date of Patent: Apr. 1, 2014

(54) IDENTIFYING AND ACCESSING A NETWORK DEVICE VIA WIRELESS COMMUNICATION

(75) Inventor: Rajesh Doshi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 11/282,421

(22) Filed: Nov. 18, 2005

(65) Prior Publication Data

US 2007/0115876 A1 May 24, 2007

(51) Int. Cl.
*H04M 3/00* (2006.01)
(52) U.S. Cl.
USPC ........... 455/420; 455/407; 455/411; 455/402; 455/416; 455/414.1; 370/329; 370/328; 370/350; 370/395.21; 370/206; 379/202.01; 379/206.01
(58) Field of Classification Search
USPC .............. 455/420, 407, 411, 502, 416, 414.1, 455/417, 518, 519; 370/329, 328, 395.21, 370/350, 260; 379/202.01–206.01
See application file for complete search history.

(56) References Cited

U.S. PATENT DOCUMENTS

| 5,010,547 | A | 4/1991 | Johnson |
| 5,012,219 | A | 4/1991 | Henry |
| 5,075,684 | A | 12/1991 | DeLuca |
| 5,359,317 | A | 10/1994 | Gomez |
| 5,394,140 | A | 2/1995 | Wong |
| 5,430,436 | A | 7/1995 | Fennell |
| 5,612,682 | A | 3/1997 | DeLuca |
| 5,650,776 | A | 7/1997 | Mitchell |
| 5,705,995 | A | 1/1998 | Laflin |
| 5,903,852 | A | 5/1999 | Schaupp, Jr. |
| 5,958,006 | A | 9/1999 | Eggleston |
| 6,157,630 | A | 12/2000 | Adler |
| 7,174,564 | B1 * | 2/2007 | Weatherspoon et al. ......... 726/2 |
| 7,320,033 | B2 * | 1/2008 | Bradfield et al. ............. 709/225 |
| 2002/0174195 | A1 * | 11/2002 | Meyer et al. .................. 709/219 |
| 2003/0083046 | A1 * | 5/2003 | Mathis .......................... 455/412 |
| 2004/0110497 | A1 * | 6/2004 | Little ............................. 455/418 |
| 2004/0185890 | A1 * | 9/2004 | Drozt et al. .................... 455/519 |
| 2004/0203363 | A1 * | 10/2004 | Carlton et al. ............... 455/41.2 |
| 2004/0235460 | A1 * | 11/2004 | Engstrom et al. .......... 455/414.1 |
| 2004/0249906 | A1 * | 12/2004 | Olbricht et al. ............... 709/220 |
| 2005/0213537 | A1 * | 9/2005 | Ingimundarson et al. .... 370/329 |
| 2006/0019698 | A1 * | 1/2006 | Ahya et al. ................. 455/552.1 |
| 2006/0045124 | A1 * | 3/2006 | Dahlstrom et al. ........... 370/465 |
| 2006/0259555 | A1 * | 11/2006 | Hassounah et al. .......... 709/206 |
| 2007/0022467 | A1 * | 1/2007 | Filbrich ........................... 726/2 |
| 2007/0112964 | A1 * | 5/2007 | Guedalia et al. ............. 709/227 |
| 2007/0115819 | A1 * | 5/2007 | Stephens et al. ............. 370/230 |

FOREIGN PATENT DOCUMENTS

| WO | WO-02/084975 A2 | 10/2002 |
| WO | 03/021978 | 3/2003 |

* cited by examiner

*Primary Examiner* — Khai M Nguyen
(74) *Attorney, Agent, or Firm* — Fulbright & Jaworski LLP

(57) ABSTRACT

One embodiment of the invention is a method that includes a mobile device receiving via a wireless communication channel a request for an identifier corresponding to a network device. The mobile device transmits the identifier. The mobile device receives a network identifier corresponding to the network device. The mobile device utilizes the network identifier to establish communication with the network device via the wireless communication channel.

15 Claims, 6 Drawing Sheets

IDENTIFYING AND ACCESSING A NETWORK DEVICE VIA WIRELESS COMMUNICATION

BACKGROUND

Computers and hand-held computer devices have become integral tools used in a wide variety of different applications. Furthermore, the functionality of a computer system or handheld computer device can be enhanced by coupling these types of stand-alone devices together in order to form a networking environment. Within a networking environment, users may readily exchange files, share information stored on a common database, pool resources, and communicate via electronic mail (e-mail).

It is appreciated that there are different types of conventional networking environments. For example, one type of networking environment is known as a wireless local area network, typically referred to as a WLAN. WLANs enable connection of a computer system or hand-held computer device with a local area network (LAN). Note that the local area network can have multiple wired and/or wirelessly connected computer or hand-held computer devices such that their users have the ability to access the same information and share data. However, there are disadvantages associated with WLANs when communicating with a LAN. For example, a LAN can have a hundred or more computers and/or hand-held computer devices connected to it. As such, if a user desires his/her hand-held computer device connected to the LAN via a WLAN to communicate with a specific computer connected to the LAN that it has not previously communicated with, the typical user can face an arduous and/or time consuming task to identify that computer from the others connected to the LAN.

SUMMARY

One embodiment of the invention is a method that includes a mobile device receiving via a wireless communication channel a request for an identifier corresponding to a network device. The mobile device transmits the identifier. The mobile device receives a network identifier corresponding to the network device. The mobile device utilizes the network identifier to establish communication with the network device via the wireless communication channel.

Another embodiment of the invention provides a method that includes a mobile device receiving via a wireless communication channel a listing of a plurality of network devices coupled to a network. The mobile device utilizes the listing and an identifier corresponding to a network device of the plurality of network devices to determine if the network device is coupled to the network. Provided the network device is coupled to the network, the mobile device utilizes the identifier to establish communication with the network device.

Yet another embodiment of the invention provides a method that includes a server transmitting a request via a wireless communication channel for an identifier corresponding to a network device. The server receives the identifier via the wireless communication channel. After receiving the identifier, the server transmits a network identifier corresponding to the network device. Note that the network identifier enables a mobile device to establish communication with the network device via wireless communication.

While particular embodiments of the present invention have been specifically described within this summary, it is noted that the invention is not limited to these embodiments. The invention is intended to cover alternatives, modifications and equivalents, which may be included within the scope of the invention as construed according to the Claims.

DETAILED DESCRIPTION

Figure 1:
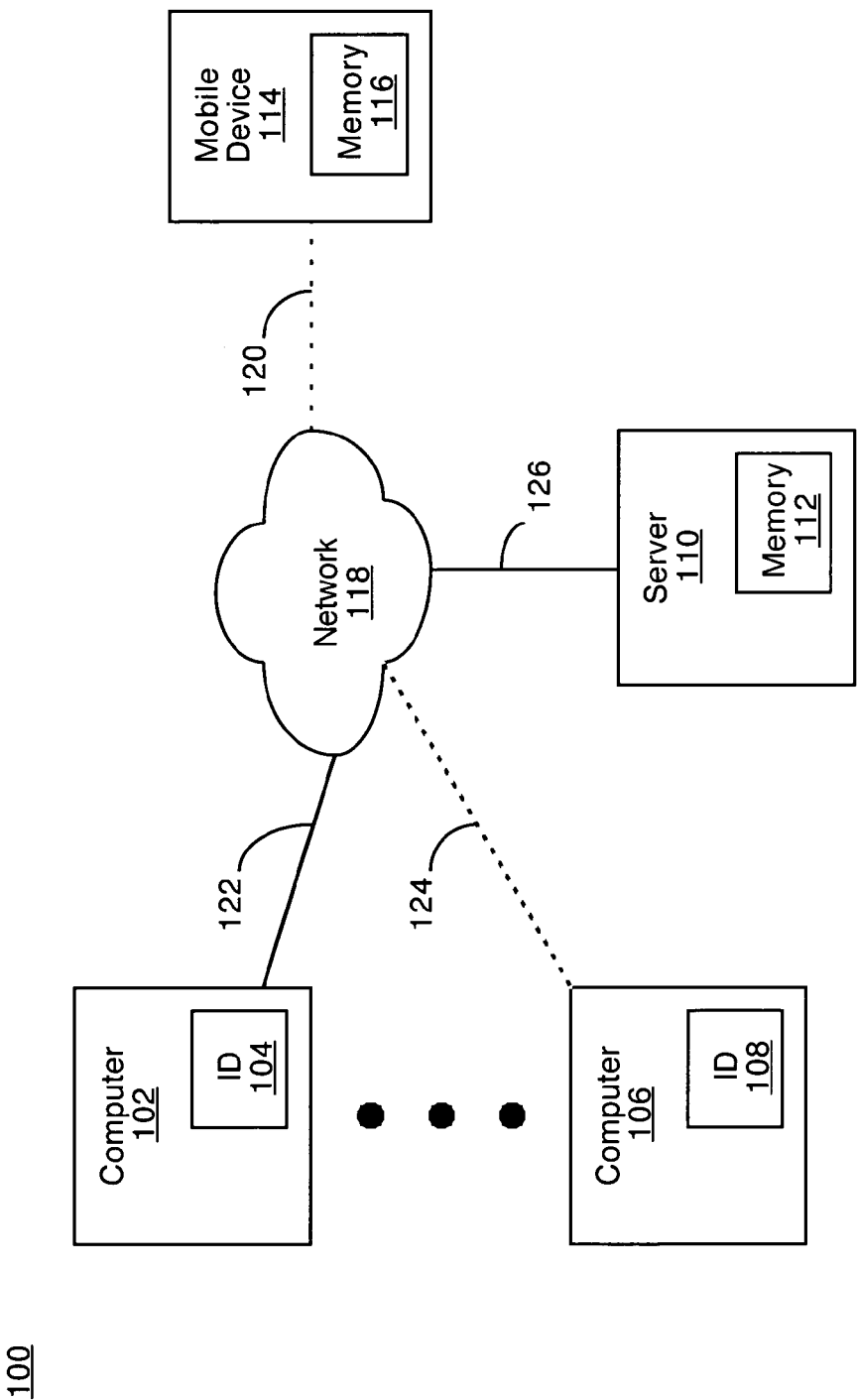
FIG. 1 is a block diagram of an exemplary system in accordance with various embodiments of the invention for identifying and accessing a computer coupled to a network via a server.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed operation, logic block, process, etc., is here, and generally, conceived to be a self-consistent sequence of operations or instructions leading to a desired result. The operations can be those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the invention, discussions utilizing terms such as "utilizing" or "transmitting" or "performing" or "coupling" or "accessing" or "receiving" or "outputting" or "generating" or "determining" or "storing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram of an exemplary system 100 in accordance with various embodiments of the invention for identifying and accessing a computer (e.g., 102) coupled to a network 118 via a server 110. For example, within system 100, communication can be established between a mobile device 114 and server computer 110 via a communication network 118. Note that mobile device 114 can communicate with network 118 via one or more wireless communication channels 120. Once communication is established between server 110 and mobile device 114, server 110 can request that mobile device 114 transmit a user name and password (or any other identifier or identifiers) that correspond to a computer (e.g., 102) the mobile device 114 would like to subsequently establish communication with. In response to the request, mobile device 114 can transmit to server 110 the user name and password (or any other identifier or identifiers) corresponding to computer 102.

Upon receiving the transmitted user name and password, server 110 can perform a verification or authentication of the user name and password to determine if they are valid. If not, server 110 can notify mobile device 114 that the received user name and password are invalid. However, if the user name and password are valid, server 110 can determine if computer 102 that is associated with the received user name and password is currently coupled to network 118. If not, server 110 notifies mobile device 114 that computer 102 is not currently coupled to network 118. However, if computer 102 is currently coupled to network 118, server 110 can determine the unique network identifier (e.g., 104) of computer 102. The server 110 can then transmit the network identifier 104 of computer 102 to mobile device 114. Upon receipt of the network identifier of computer 102, mobile device 114 can use it to locate and establish communication with computer 102 via network 118 and wireless communication channel 120. Once communication is established, mobile device 114 can access data stored by computer 102 and vice versa. For example, mobile device 114 and computer 102 can perform a synchronization of data stored by both devices.

System 100 includes mobile device 114, server 110, and computers 102 and 106 that can each be coupled to network 118. Note that server 110 and computer 102 can be coupled to network 118 via wired communication technology 126 and 122, respectively, as indicated by solid lines. Computer 106 and mobile device 114 can be coupled to network 118 via one or more wireless communication channels 124 and 120, respectively, as indicated by dashed lines. However, it is understood that server 110, and computers 102 and 106 can each be coupled to network 118 utilizing wired and/or wireless communication technology. It is appreciated that server 110 and computers 102 and 106 can each be implemented in a wide variety of ways. For example, server 110 and computers 102 and 106 can each be implemented as, but is not limited to, a desktop computer system, a laptop computer system, a workstation, a computing device, a mainframe computer system, or a portable computing device. It is noted that system 100 can include one or more computers similar to computer 102 or 106. Furthermore, server 110 can be implemented as a single physical computing device or as multiple physical computing devices. Understand that mobile device 114 can be implemented in a wide variety of ways. For example, mobile device 114 can be implemented as, but is not limited to, a mobile telephone, a mobile computing device, a portable hand-held computing device, and the like.

Within system 100 of FIG. 1, mobile device 114 can include memory 116 that can be implemented with, but not limited to, volatile and/or non-volatile memory. Note that the user name and password corresponding to computer 102 that can be transmitted by mobile device 114 can be stored by memory 116. It is understood that server 110 can include memory 112 that can be implemented with, but not limited to, volatile and/or non-volatile memory. The network identifiers (e.g., 104 and 108) associated with computers 102 and 106 can be stored by memory 112 of server 110, respectively. Within system 100, the network identifiers (e.g., 104 and 108) can be dynamic or static.

For example, if the network identifiers (e.g., 104 and 108) of system 100 are dynamic, server 110 can utilizes memory 112 to store one or more lookup tables (not shown) that associate the current network identifier of each computer communicatively coupled to network 118 with its corresponding user name and password (or any other identifier or identifiers). In this manner, after receiving the user name and password sent by mobile device 114, the server 110 can access one or more lookup tables to determine which current network identifier (e.g., 104 or 108) corresponds to the received user name and password (or any other identifier or identifiers). Once the current network identifier (e.g., 108) is determined, the server 110 can output or transmit it to mobile device 114 via network 118. Understand that one variation to this is that if the network identifier (e.g., 104 or 108) is dynamic, mobile device 114 can send the latest network identifier to the server 110, which can then send the updated network identifier to mobile device 114.

Within FIG. 1, if the network identifiers (e.g., 104 and 108) of system 100 are static or fixed, server 110 can determine which network identifier corresponds to the received user name and password in at least two different ways. For example in one embodiment, upon receiving the user name and password output by mobile device 114, server 110 can query any computers (e.g., 102 and 106) coupled to network 118 to determine which, if any, computer is associated with the received user name and password. If no computer is associated with the received user name and password, the server 110 notifies the mobile device of such via network 118. However, if a computer (e.g., 102) is associated with the received user name and password, server 110 can then determine the network identifier (e.g., 104) of computer 102 and then can transmit it to mobile device 114.

In another embodiment, server 110 can utilizes memory 112 to store one or more lookup tables (not shown) that associate the static network identifier of each computer coupled to network 118 with its corresponding user name and password. In this fashion, after receiving the user name and password sent by mobile device 114, server 110 can access one or more lookup tables to determine which static network identifier (e.g., 104 or 108) corresponds to the received user name and password. Once the static network identifier (e.g., 108) is determined, server 110 can output or transmit it to mobile device 114 via wireless network 118. It is noted that after receiving the static network identifier (e.g., 108), mobile device 114 can store it thereby enabling mobile device 114 to establish communication with the computer (e.g., 102) corresponding with the received static network identifier (e.g., 108) any time it is desirable. It is understood that the network identifiers 104 and 108 can be implemented in a wide variety of ways. For example, the network identifiers 104 and 108 can each be implemented as, but not limited to, a Media Access Control (MAC) address, an Internet Protocol (IP) address, or the like. The network identifiers 104 and 108 can each be implemented as a unique identifier.

Within system 100, network 118 can be implemented in a wide variety of ways. For example, network 118 can be implemented with, but not limited to, one or more wired and/or wireless communication technologies. It is noted that a the wireless communication technology can include, but is not limited to, Wi-Fi® (Wireless Fidelity) communication technology, Bluetooth® wireless communication technology, cellular communication technology, Global System for Mobile Communications (GSM) technology, General Packet Radio Service (GPRS) communication technology, Code Division Multiple Access (CDMA) communication technology, Enhanced Data GSM Environment (EDGE) communication technology, Time Division Multiple Access (TDMA) communication technology, Evolution Data Only or Evolution Data Optimized (EVDO) communication technology, third-generation wireless (3G) communication technology, Universal Mobile Telecommunications Service (UMTS) technology, Wideband Code Division Multiple Access (W-CDMA) communication technology, time division synchronous code division multiple access (TD-SCDMA) communication technology, any wireless communication technology, or any combination thereof. It is appreciated that the one or more wireless communication channels 120 utilized by mobile device 114 can be implemented with any one or more of the wireless communication technologies mentioned herein, but is not limited to such. As such, mobile device 114, server 110, and computers 102 and 106 are implemented to communicate via network 118.

Within FIG. 1, it is appreciated that the user name and password that can be requested by server 110 and can be transmitted by mobile device 114 can each be a unique identifier or together can be a unique identifier corresponding to a computer (e.g., 102) that the mobile device 114 would like to subsequently establish communication with. Furthermore, the user name and password that can be requested by server 110 and can be transmitted by mobile device 114 may be substituted with any type of unique identifier or identifiers corresponding to a computer (e.g., 102) that the mobile device 114 would like to subsequently establish communication with. Moreover, in various embodiments, the user name and password can correspond to any shared network drive coupled to wireless network 118.

In accordance with various embodiments, note that before any of the operations of system 100 begin, the mobile device 114 and the computer (e.g., 102) it wants to subsequently establish communication with have not previously communicated. It is appreciated that additional elements or components can be included as part of system 100. Moreover, less elements or components can be utilized within system 100. In various embodiments, the operations described with reference to system 100 can be performed automatically and without any interaction by a user of mobile device 114. Understand that the operations described with reference to system 100 can be performed by software, by firmware, by electronic hardware, or by any combination thereof.

Figure 2:
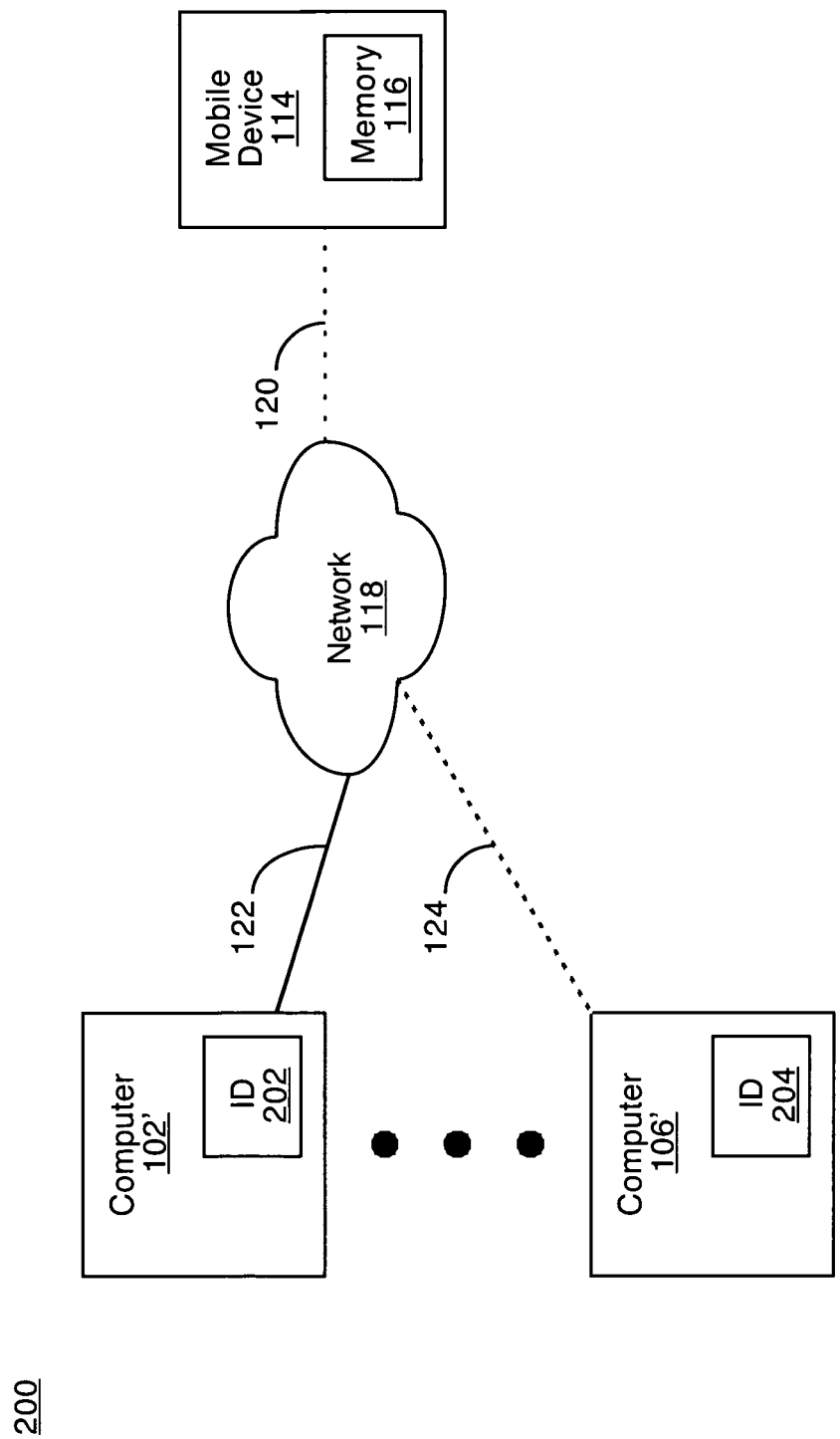
FIG. 2 is a block diagram of an exemplary system in accordance with various embodiments of the invention for identifying and accessing a computer coupled to a network.

FIG. 2 is a block diagram of an exemplary system 200 in accordance with various embodiments of the invention for identifying and accessing a computer (e.g., 106') coupled to a network 118. For example, within system 200, wireless communication can be established between mobile device 114 and communication network 118. Note that mobile device 114 can communicate with network 118 via one or more wireless communication channels 120. Once communication is established between mobile device 114 and network 118, the mobile device 114 can receive a listing or list of any computers (e.g., 102' and 106') that are currently coupled to the network 118. The mobile device 114 can determine if computer 106' (which it would like to establish communication with) is currently communicatively coupled to the network 118. Note that this determination can involve utilizing a user name and password (or any other identifier or identifiers) that is associated with computer 106'. If it is determined that computer 106' is currently communicatively coupled to the network 118, the mobile device 114 can utilize the user name and password to establish communication with computer 106' via the network 118. Once communication is established, the mobile device 114 can access data stored by the computer 106' and vice versa. For example, the mobile device 114 and computer 106' can perform a synchronization of data stored by both devices.

Note that system 200 includes mobile device 114 and computers 102' and 106' that can each be coupled to network 118. Note that computer 102' can be coupled to network 118 via wired communication technology 122, as indicated by a solid line. Computer 106' and mobile device 114 can be coupled to network 118 via one or more wireless communication channels 124 and 120, respectively, as indicated by dashed lines. However, it is understood that computers 102' and 106' can each be coupled to network 118 utilizing wired and/or wireless communication technology. Computers 102' and 106' can each be implemented in a wide variety of ways. For example, computers 102' and 106' can each be implemented as, but is not limited to, a desktop computer system, a laptop computer system, a workstation, a computing device, a mainframe computer system, or a portable computing device. Note that system 200 can include one or more computers similar to computer 102' or 106'. Mobile device 114 can be implemented in a wide variety of ways. For example, mobile device 114 can be implemented as, but is not limited to, a mobile telephone, a mobile computing device, a portable hand-held computing device, and the like.

Within system 200 of FIG. 2, mobile device 114 can include memory 116 that can be implemented with, but not limited to, volatile and/or non-volatile memory. Note that the user name and password corresponding to computer 106' that can be transmitted by mobile device 114 can be stored by memory 116. The identifiers 202 and 204 associated with computers 102' and 106', respectively, can be stored by their respective computer. It is understood that the identifiers 202 and 204 can be implemented in a wide variety of ways. For example, the identifiers 202 and 204 can each be implemented as, but not limited to, a unique user name and password combination, a unique user name, a unique password, or any type of unique identifier or identifiers.

Within FIG. 2, in one embodiment, note that the mobile device 114 can query any computers (e.g., 102' and 106') communicatively coupled to network 118 to determine which, if any, computer is associated with the user name and password. If no computer is associated with the user name and password, the mobile device 114 can provide a notification of such to its user. However, if a computer (e.g., 106') is associated with the received user name and password, mobile device 114 can then establish communication with computer 106' via network 118. In various embodiments, the user name and password can correspond to a computer (e.g., 106') or any shared network drive coupled to network 118.

Within system 200, network 118 can be implemented in a wide variety of ways. For example, network 118 can be implemented with, but not limited to, one or more wired and/or wireless communication technologies. It is noted that a wireless communication technology can include, but is not limited to, Wi-Fi® (Wireless Fidelity) communication technology, Bluetooth® wireless communication technology, cellular communication technology, Global System for Mobile Communications (GSM) technology, General Packet Radio Service (GPRS) communication technology, Code Division Multiple Access (CDMA) communication technology, Enhanced Data GSM Environment (EDGE) communication technology, Time Division Multiple Access (TDMA) communication technology, Evolution Data Only or Evolution Data Optimized (EVDO) communication technology, third-generation wireless (3G) communication technology, Universal Mobile Telecommunications Service (UMTS) technology, Wideband Code Division Multiple Access (W-CDMA) communication technology, time division synchronous code division multiple access (TD-SCDMA) communication technology, any wireless communication technology, or any combination thereof. It is appreciated that the one or more wireless communication channels 120 utilized by mobile device 114 can be implemented with any one or more of the wireless communication technologies mentioned herein, but is not limited to such. As such, mobile device 114 and computers 102' and 106' are implemented to communicate via network 118.

In accordance with various embodiments, note that before any of the operations of system 200 of FIG. 2 begin, the mobile device 114 and the computer (e.g., 106') it wants to subsequently establish communication with have not previously communicated. Note that additional elements or components can be included as part of system 200. Moreover, less elements or components can be utilized within system 200. In various embodiments, the operations described with reference to system 200 can be performed automatically and without any interaction by a user of mobile device 114. Understand that the operations described with reference to system 200 can be performed by software, by firmware, by electronic hardware, or by any combination thereof.

Figure 3:
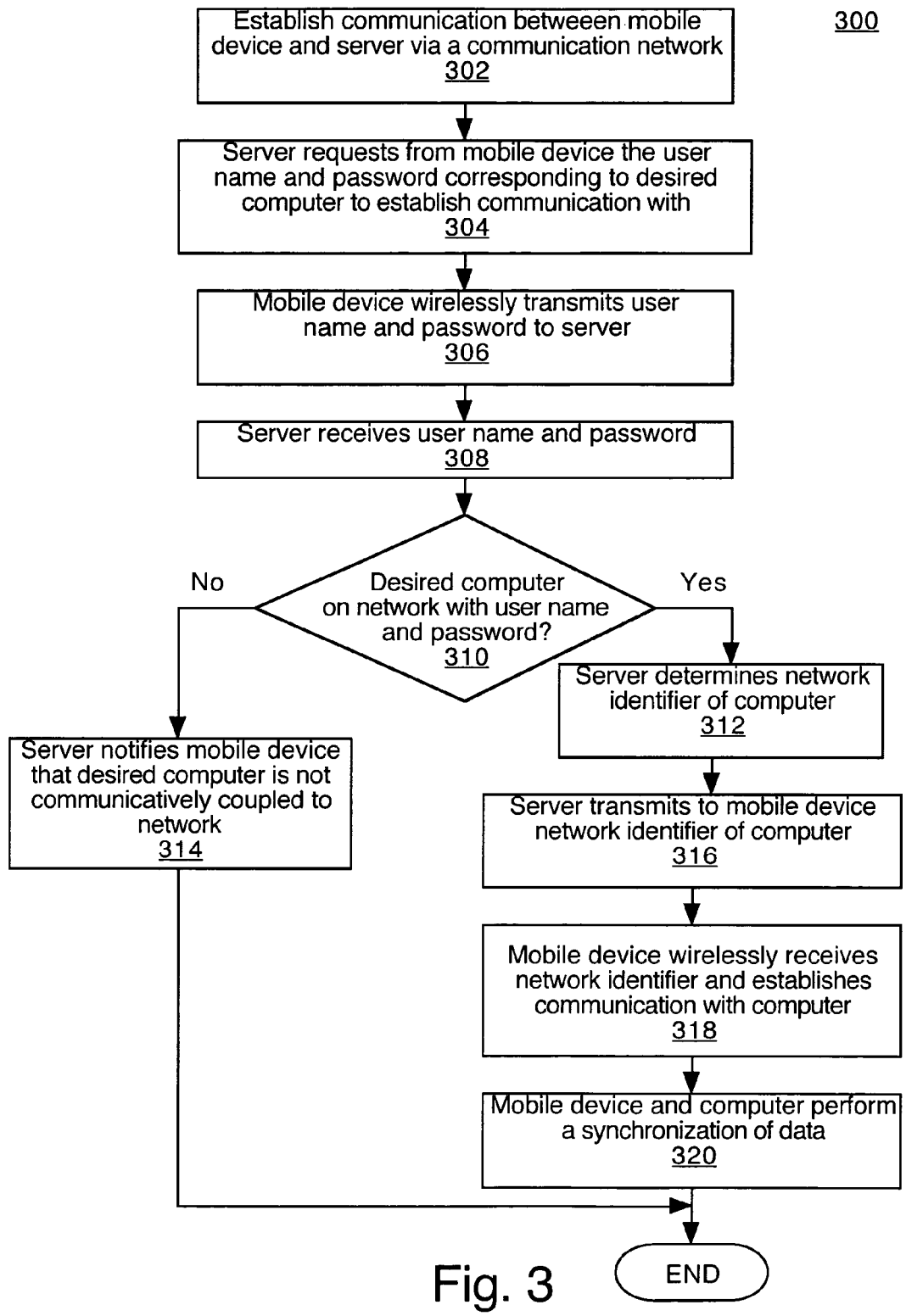
FIG. 3 is a flow diagram of a method in accordance with various embodiments of the invention for identifying and accessing a computer coupled to a network.

FIG. 3 is a flow diagram of a method 300 in accordance with various embodiments of the invention for identifying and accessing a computer communicatively coupled to a network via a server. Method 300 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 300, such operations are exemplary. That is, method 300 may not include all of the operations illustrated by FIG. 3. Also, method 300 may include various other operations and/or variations of the operations shown by FIG. 3. Likewise, the sequence of the operations of method 300 can be modified. It is noted that the operations of method 300 can be performed by software, by firmware, by electronic hardware, or by any combination thereof.

Specifically, communication can be established between a mobile device and a server computer via a communication network. Once communication is established, the server can request that the mobile device transmit a user name and password corresponding to the computer the mobile device would like to subsequently establish communication with. The mobile device can wirelessly transmit to the server the user name and password corresponding to the computer. The server receives the transmitted user name and password. The server determines if the computer associated with the received user name and password is currently communicatively coupled to the network. If not, the server can notify the mobile device that the computer is not currently communicatively coupled to the network. However, if it is determined that the computer is currently communicatively coupled to the network, the server can determine the unique network identifier of that computer. The server can output to the mobile device the network identifier of the computer. The mobile device wirelessly receives the computer's network identifier, which it can use to locate and establish communication with the computer via the network. Once communication is established, the mobile device can access data stored by the computer and vice versa. For example, the mobile device and computer can perform a synchronization of data stored by both devices. In accordance with various embodiments, it is noted that the computer of method 300 can be substituted with any network shared drive, but is not limited to such.

At operation 302 of FIG. 3, communication can be established between a mobile device (e.g., 114) and a server computer (e.g., 110) via a communication network (e.g., 118). Understand that operation 302 can be implemented in a wide variety of ways. For example, operation 302 can be implemented in any manner similar to that described herein, but is not limited to such.

At operation 304, once communication is established between the mobile device and the server, the server can request that the mobile device transmit a user name and password corresponding to the computer (e.g., 102 or 106) the mobile device would like to subsequently establish communication with. It is appreciated that operation 304 can be implemented in a wide variety of ways. For example, operation 304 can be implemented in any manner similar to that described herein, but is not limited to such.

At operation 306 of FIG. 3, the mobile device can wirelessly transmit to the server via the network the user name and password corresponding to the computer. It is noted that operation 306 can be implemented in a wide variety of ways. For example, operation 306 can be implemented in any manner similar to that described herein, but is not limited to such.

At operation 308, the server can receive the transmitted user name and password. It is understood that operation 308 can be implemented in a wide variety of ways. For example, operation 308 can be implemented in any manner similar to that described herein, but is not limited to such.

At operation 310 of FIG. 3, the server can determine or ascertain whether the computer associated with the received user name and password is currently communicatively coupled to the network. If not, process 300 can proceed to operation 314. However, if the computer is communicatively coupled to the network at operation 310, process 300 can proceed to operation 312. It is understood that operation 310 can be implemented in a wide variety of ways. For example, operation 310 can be implemented in any manner similar to that described herein, but is not limited to such.

At operation 314, the server notifies the mobile device that the computer is not currently communicatively coupled to the wireless network. It is understood that operation 314 can be implemented in a wide variety of ways. For example, the notification at operation 314 can be implemented as, but is not limited to, a text message that can be eventually read by a user of mobile device 114, a notification signal recognized by mobile device 114, an audio message that can be eventually heard by a user of mobile device 114, a graphics image including a message that can be viewed by a user of mobile device 114, and the like. Note that operation 314 can be implemented in any manner similar to that described herein, but is not limited to such. At the completion of operation 314, method 300 can be exited.

At operation 312 of FIG. 3, the server can determine or ascertain the unique network identifier (e.g., 104 or 108) associated with the computer. It is appreciated that operation 312 can be implemented in a wide variety of ways. For example, operation 312 can be implemented in any manner similar to that described herein, but is not limited to such.

At operation 316, once determined, the server can transmit or output to the mobile device the network identifier associated with the computer. Understand that operation 316 can be implemented in a wide variety of ways. For example, operation 316 can be implemented in any manner similar to that described herein, but is not limited to such.

At operation 318 of FIG. 3, the mobile device can wirelessly receive the computer's network identifier, which the mobile device can use in order to locate and establish communication with the computer via the network. Appreciate that operation 318 can be implemented in a wide variety of ways. For example, operation 318 can be implemented in any manner similar to that described herein, but is not limited to such.

At operation 320, once communication between the mobile device and the computer is established, the mobile device can access data stored by the computer and vice versa. It is understood that operation 320 can be implemented in a wide variety of ways. For example, at operation 320, the mobile device and computer can perform a synchronization of data stored by both devices. Note that operation 320 can be implemented in any manner similar to that described herein, but is not limited to such. At the completion of operation 320, method 300 can be exited.

Figure 4:
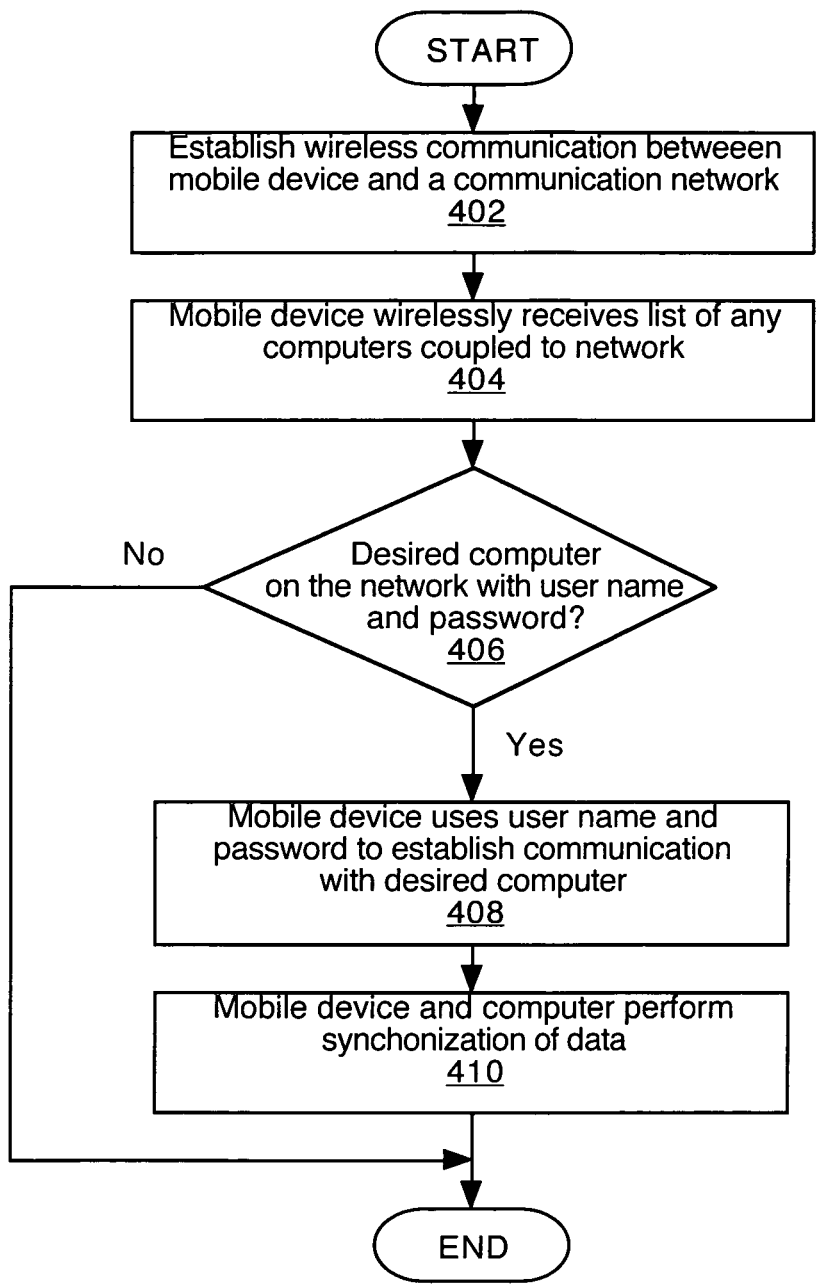
FIG. 4 is a flow diagram of another method in accordance with various embodiments of the invention for identifying and accessing a computer coupled to a network.

FIG. 4 is a flow diagram of a method 400 in accordance with various embodiments of the invention for identifying and accessing a computer communicatively coupled to a network. Method 400 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 400, such operations are exemplary. That is, method 400 may not include all of the operations illustrated by FIG. 4. Also, method 400 may include various other operations and/or variations of the operations shown by FIG. 4. Likewise, the sequence of the operations of method 400 can be modified. It is noted that the operations of method 400 can be performed by software, by firmware, by electronic hardware, or by any combination thereof.

Specifically, wireless communication can be established between a mobile device and a communication network. Once wireless communication is established, the mobile device can wirelessly receive a listing or list of any computers that are currently communicatively coupled to the communication network. The mobile device can determine if a computer that it would like to establish communication with is currently communicatively coupled to the network. Note that this determination can include utilizing a user name and password associated with the computer. If the desired computer is not communicatively coupled to the network, method 400 can be exited. However, if it is determined that the desired computer is currently communicatively coupled to the network, the mobile device can utilize the user name and password to establish communication with the computer via the network. Once communication is established, the mobile device can access data stored by the computer and vice versa. For example, the mobile device and computer can perform a synchronization of data stored by both the computer and the mobile device. In accordance with various embodiments, it is noted that the computer of method 400 can be substituted with any network shared drive, but is not limited to such.

At operation 402 of FIG. 4, wireless communication can be established between a mobile device (e.g., 114) and a communication network (e.g., 118). Understand that operation 402 can be implemented in a wide variety of ways. For example, operation 402 can be implemented in any manner similar to that described herein, but is not limited to such.

At operation 404, once wireless communication is established between the mobile device and the network, the mobile device can wirelessly receive a listing or list of any computers (e.g., 102' and 106') that are currently communicatively coupled to the network. Appreciate that operation 404 can be implemented in a wide variety of ways. For example, operation 404 can be implemented in any manner similar to that described herein, but is not limited to such.

At operation 406 of FIG. 4, the mobile device can determine whether a computer (e.g., 102' or 106') that it would like to establish communication with is currently communicatively coupled to the network. Note that this determination at operation 406 can include utilizing a user name and password (e.g., 202) associated with the computer (e.g., 102'). If the computer is not communicatively coupled to the network, method 400 can be exited. However, if the computer is currently communicatively coupled to the network at operation 406, method 400 can proceed to operation 408. Note that operation 406 can be implemented in a wide variety of ways. For example, operation 406 can be implemented in any manner similar to that described herein, but is not limited to such.

At operation 408, the mobile device can utilize the user name and password to establish communication with the computer via the network. It is appreciated that operation 408 can be implemented in a wide variety of ways. For example, operation 408 can be implemented in any manner similar to that described herein, but is not limited to such.

At operation 410 of FIG. 4, once communication is establish between the mobile device and the computer, the mobile device can access data stored by the computer and vice versa. It is understood that operation 410 can be implemented in a wide variety of ways. For example in one embodiment, the mobile device and computer can perform a synchronization of data stored by both the computer and the mobile device. Note that operation 410 can be implemented in any manner similar to that described herein, but is not limited to such. Upon completion of operation 410, process 400 can be exited.

Figure 5:
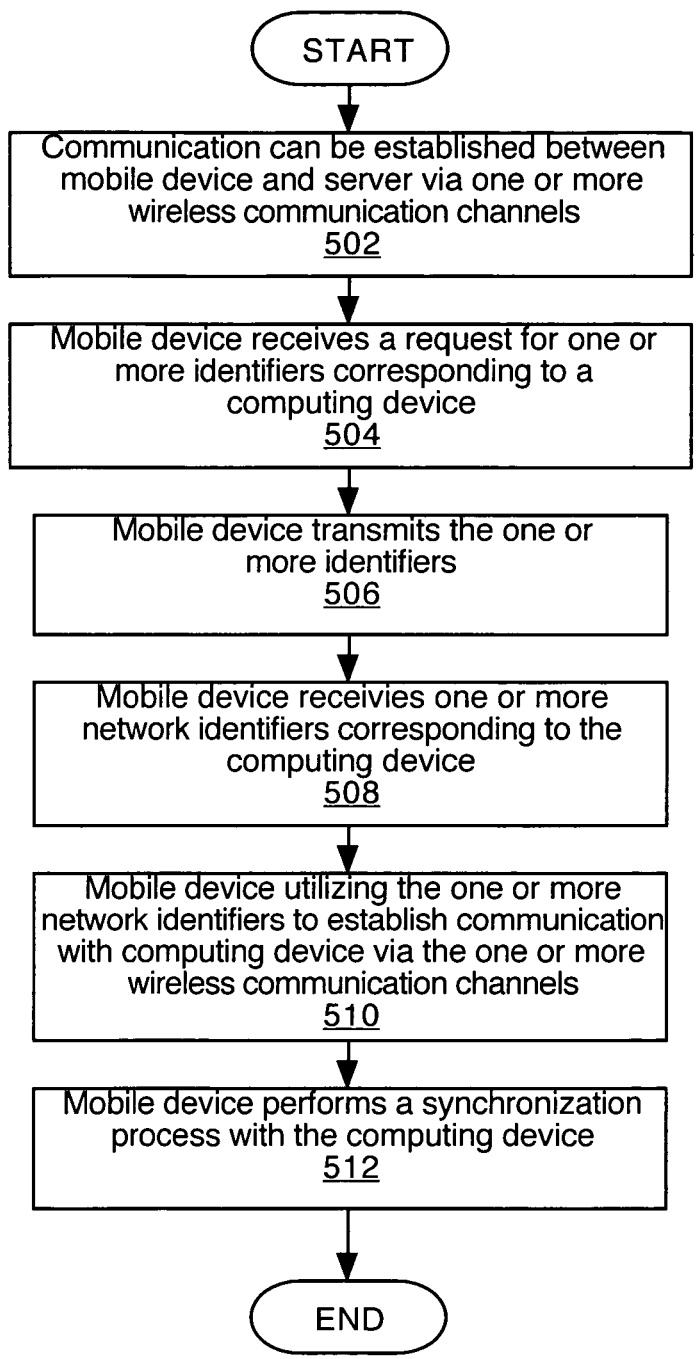
FIG. 5 is a flow diagram of a method in accordance with various embodiments of the invention for a mobile device to identify and access a computing device coupled to a network.

FIG. 5 is a flow diagram of a method 500 in accordance with various embodiments of the invention for a mobile device to identify and access a computing device communicatively coupled to a network. Method 500 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 500, such operations are exemplary. That is, method 500 may not include all of the operations illustrated by FIG. 5. Also, method 500 may include various other operations and/or variations of the operations shown by FIG. 5. Likewise, the sequence of the operations of method 500 can be modified. It is noted that the operations of method 500 can be performed by software, by firmware, by electronic hardware, or by any combination thereof.

Specifically, communication can be established between a mobile device and a server via one or more wireless communication channels. The mobile device can receive a request for one or more identifiers corresponding to a computing device. The mobile device can transmit the one or more identifiers. The mobile device can receive one or more network identifiers corresponding to the computing device. The mobile device can utilize the one or more network identifiers to establish communication with the computing device via the one or more wireless communication channels. The mobile device can perform a synchronization process with the computing device. In accordance with various embodiments, it is noted that the computing device of method 500 can be substituted with any network shared drive.

At operation 502 of FIG. 5, communication can be established between a mobile device (e.g., 114) and a server (e.g., 110) via one or more wireless communication channels (e.g., 120). Understand that operation 502 can be implemented in a wide variety of ways. For example, operation 502 can be implemented in any manner similar to that described herein, but is not limited to such.

At operation 504, the mobile device can receive a request for one or more identifiers corresponding to a computing device (e.g., 102 or 106). Appreciate that operation 504 can be implemented in a wide variety of ways. For example, operation 504 can be implemented in any manner similar to that described herein, but is not limited to such.

At operation 506 of FIG. 5, the mobile device can transmit the one or more identifiers (e.g., user name and/or password). Note that operation 506 can be implemented in a wide variety of ways. For example, operation 506 can be implemented in any manner similar to that described herein, but is not limited to such.

At operation 508, the mobile device can receive one or more network identifiers (e.g., 104 or 108) corresponding to the computing device. It is appreciated that operation 508 can be implemented in a wide variety of ways. For example, operation 508 can be implemented in any manner similar to that described herein, but is not limited to such.

At operation 510 of FIG. 5, the mobile device can utilize the one or more network identifiers to establish communication with the computing device (e.g., 102 or 106) via the one or more wireless communication channels. It is understood that operation 510 can be implemented in a wide variety of ways. For example, operation 510 can be implemented in any manner similar to that described herein, but is not limited to such.

At operation 512, the mobile device can perform a synchronization process with the computing device. Note that operation 512 can be implemented in a wide variety of ways. For example, operation 512 can be implemented in any manner similar to that described herein, but is not limited to such. Upon completion of operation 512, process 500 can be exited.

Figure 6:
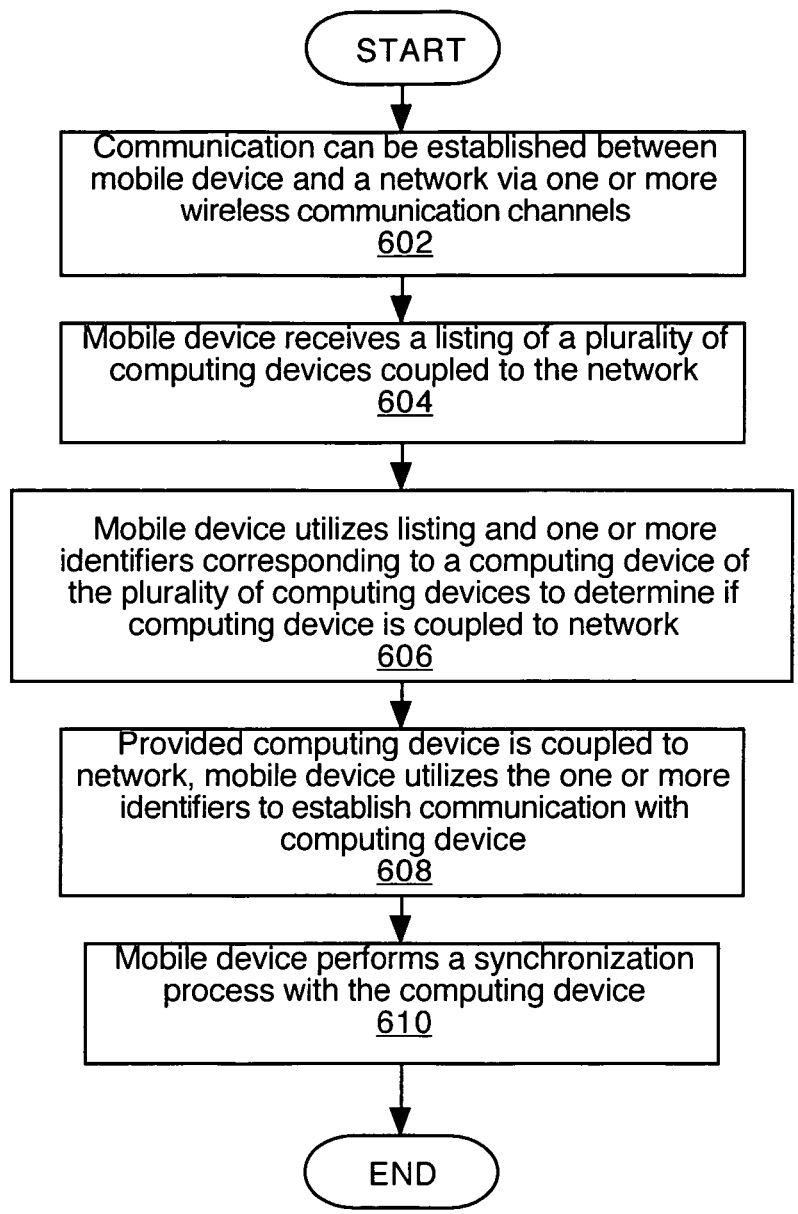
FIG. 6 is a flow diagram of another method in accordance with various embodiments of the invention for a mobile device to identify and access a computing device coupled to a network.

FIG. 6 is a flow diagram of a method 600 in accordance with various embodiments of the invention for a mobile device to identify and access a computing device coupled to a network. Method 600 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 600, such operations are exemplary. That is, method 600 may not include all of the operations illustrated by FIG. 6. Also, method 600 may include various other operations and/or variations of the operations shown by FIG. 6. Likewise, the sequence of the operations of method 600 can be modified. It is noted that the operations of method 600 can be performed by software, by firmware, by electronic hardware, or by any combination thereof.

Specifically, communication can be established between a mobile device and a network via one or more wireless communication channels. The mobile device can receive a listing or list of a plurality of computing devices coupled to the network. The mobile device can utilize the listing (or list) and one or more identifiers corresponding to a computing device of the plurality of computing devices to determine if the computing device is coupled to the network. Provided the computing device is coupled to the network, the mobile device can utilize the one or more identifiers to establish communication with the computing device. The mobile device can perform a synchronization process with the computing device. In accordance with various embodiments, it is noted that the computing device of method 600 can be substituted with any network shared drive.

At operation 602 of FIG. 6, communication can be established between a mobile device (e.g., 114) and a network (e.g., 118) via one or more wireless communication channels (e.g., 120). Understand that operation 602 can be implemented in a wide variety of ways. For example, operation 602 can be implemented in any manner similar to that described herein, but is not limited to such.

At operation 604, the mobile device can receive a listing or list of a plurality of computing devices (e.g., 102' and 106') coupled to the network. Appreciate that operation 604 can be implemented in a wide variety of ways. For example, operation 604 can be implemented in any manner similar to that described herein, but is not limited to such.

At operation 606 of FIG. 6, the mobile device can utilize the listing (or list) and one or more identifiers corresponding to a computing device (e.g., 102' or 106') of the plurality of computing devices to determine if the computing device is coupled to the network. Note that operation 606 can be implemented in a wide variety of ways. For example, operation 606 can be implemented in any manner similar to that described herein, but is not limited to such.

At operation 608, provided the computing device is coupled to the network, the mobile device can utilize the one or more identifiers to establish communication with the computing device. It is appreciated that operation 608 can be implemented in a wide variety of ways. For example, operation 608 can be implemented in any manner similar to that described herein, but is not limited to such.

At operation 610 of FIG. 6, the mobile device can perform a synchronization process with the computing device. Note that operation 610 can be implemented in a wide variety of ways. For example, operation 610 can be implemented in any manner similar to that described herein, but is not limited to such. Upon completion of operation 610, process 600 can be exited.

It is understood that a network device can be substituted for any computing device, computer system, or computer mentioned herein (e.g., 102, 102', 106, and/or 106'). Note that a network device can include, but is not limited to, a database, a server, a network shared drive, a portable computing device, a mobile telephone, a printer, a facsimile (Fax) machine, a hand-held computing device, or any combination thereof.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
    transmitting a first identifier from a first device to a server in a network, wherein said network is communicatively coupled to a plurality of devices, wherein said plurality comprises a second device, said first identifier comprising a user name for said second device;
    after said transmitting, receiving from said server at said first device a unique second identifier for said second device, wherein said second identifier is found based on said user name; and
    utilizing said second identifier at said first device to establish wireless communication between said first device and said second device, wherein said wireless communication occurs directly between said first device and said second device and bypasses said server.

2. The method of claim 1, further comprising:
    performing a synchronization process between said first device and said second device.

3. The method of claim 1, wherein said wireless communication channel is selected from the group consisting of: Wi-Fi® communication, Bluetooth® wireless communication, cellular communication, Global System for Mobile Communications (GSM), General Packet Radio Service (GPRS) communication, Code Division Multiple Access (CDMA) communication technology, Enhanced Data GSM Environment (EDGE) communication technology, Time Division Multiple Access (TDMA) communication technology, Evolution Data Only or Evolution Data Optimized (EVDO) communication technology, third-generation wireless (3G) communication technology, Universal Mobile Telecommunications Service (UMTS) technology, Wideband Code Division Multiple Access (W-CDMA) communication technology, and time division synchronous code division multiple access (TD-SCDMA) communication technology.

4. The method of claim 1, wherein said second identifier is static or dynamic.

5. The method of claim 1, wherein said second identifier is selected from the group consisting of: a Media Access Control (MAC) address, and an Internet Protocol (IP) address.

6. The method of claim 1, further comprising:
    receiving at said first device a text message from said server.

7. A method comprising:
    establishing communication between a mobile device and a network via a wireless communication channel;
    receiving at said mobile device via said wireless communication channel a listing of a plurality of network devices coupled to said network;
    utilizing at said mobile device said listing and a first identifier comprising a user name associated with a particular network device of said plurality to determine if said particular network device is coupled to said network; and
    provided said particular network device is coupled to said network, utilizing at said mobile device a unique second identifier for said particular network device to establish direct wireless communication between said mobile device and said particular network device, wherein information stored by said particular network device is accessible by said mobile device and vice versa.

8. The method of claim 7, further comprising:
    performing a synchronization process between said mobile device and said particular network device.

9. The method of claim 7, wherein said wireless communication channel is selected from the group consisting of: Wi-Fi® communication technology, Bluetooth® wireless communication technology, cellular communication technology, Global System for Mobile Communications (GSM) technology, General Packet Radio Service (GPRS) communication technology, Code Division Multiple Access (CDMA) communication technology, Enhanced Data GSM Environment (EDGE) communication technology, Time Division Multiple Access (TDMA) communication technology, Evolution Data Only or Evolution Data Optimized (EVDO) communication technology, third-generation wireless (3G) communication technology, Universal Mobile Telecommunications Service (UMTS) technology, Wideband Code Division Multiple Access (W-CDMA) communication technology, and time division synchronous code division multiple access (TD-SCDMA) communication technology.

10. The method of claim 7, further comprising:
    provided said particular network device is not coupled to said network, said mobile device outputting a notification that said particular network device is not coupled to said network.

11. A method comprising:
    transmitting from a server to a mobile device a request via a wireless communication channel for an identifier, wherein said server is coupled to a network comprising a plurality of network devices;
    in response to said request, receiving from said mobile device at said server a first identifier comprising a user name and a password associated with said user name, said first identifier uniquely associated with a network device of said network devices; and
    after receiving said first identifier at said server, transmitting from said server to said mobile device a unique second identifier uniquely corresponding to said network device, wherein said second identifier enables said mobile device to establish direct wireless communication with said network device, wherein said wireless communication bypasses said server.

12. The method of claim 11, wherein said second identifier is selected from the group consisting of: a Media Access Control (MAC) address, and an Internet Protocol (IP) address.

13. The method of claim 11, wherein said wireless communication channel is selected from the group consisting of: Wi-Fi® communication, Bluetooth® wireless communication, cellular communication, Global System for Mobile Communications (GSM), General Packet Radio Service (GPRS) communication, Code Division Multiple Access (CDMA) communication technology, Enhanced Data GSM Environment (EDGE) communication technology, Time Division Multiple Access (TDMA) communication technology, Evolution Data Only or Evolution Data Optimized (EVDO) communication technology, third-generation wireless (3G) communication technology, Universal Mobile Telecommunications Service (UMTS) technology, Wideband Code Division Multiple Access (W-CDMA) communication technology, and time division synchronous code division multiple access (TD-SCDMA) communication technology.

14. The method of claim 11, wherein said second identifier is static or dynamic.

15. The method of claim 11, further comprising:
   transmitting a text message from said server to said mobile device.

* * * * *